United States Patent [19]

Miller et al.

[11] Patent Number: 5,886,490
[45] Date of Patent: Mar. 23, 1999

[54] DIGITAL ROTARY OPTICAL ACCELERATOR

[75] Inventors: Michael Justin Miller, Mentor-on-the-Lake; Scott Robert Shepler, Painesville; Bruce Alan Nielsen, Perry, all of Ohio

[73] Assignee: Apsco International, Perry, Ohio

[21] Appl. No.: 848,515

[22] Filed: Apr. 28, 1997

[51] Int. Cl.⁶ ............................ H02P 5/34; G05B 13/00
[52] U.S. Cl. ...................... 318/561; 318/646; 318/599; 400/320
[58] Field of Search ....................... 318/560–696, 318/480, 811, 807; 250/561, 570, 239, 223 R; 604/22, 28, 30, 65; 388/933; 112/227; 73/118.11; 324/166, 175

[56] References Cited

U.S. PATENT DOCUMENTS

| | | | |
|---|---|---|---|
| 3,792,261 | 2/1974 | Canup et al. | 250/233 |
| 3,814,199 | 6/1974 | Jones | 180/6.5 |
| 3,886,354 | 5/1975 | Swiden et al. | 250/233 |
| 4,342,910 | 8/1982 | Pfeifer et al. | 250/237 G |
| 4,442,351 | 4/1984 | Pfeifer et al. | 250/237 G |
| 4,583,028 | 4/1986 | Angersbach et al. | 318/254 |
| 4,584,472 | 4/1986 | Wiblin et al. | 250/237 |
| 4,692,676 | 9/1987 | Dohi et al. | 318/269 |
| 4,939,440 | 7/1990 | Burke | 318/646 |
| 4,983,901 | 1/1991 | Lehmer | 318/685 |
| 5,021,676 | 6/1991 | Dragon et al. | 250/561 |
| 5,120,977 | 6/1992 | Dragon et al. | 350/561 |
| 5,150,030 | 9/1992 | Ito et al. | 318/811 |
| 5,202,627 | 4/1993 | Sale | 324/166 |
| 5,216,916 | 6/1993 | Bederna et al. | 73/118.1 |
| 5,233,277 | 8/1993 | Kasig et al. | 318/551 |
| 5,268,624 | 12/1993 | Zanger | 318/551 |
| 5,342,293 | 8/1994 | Zanger | 604/22 |
| 5,352,900 | 10/1994 | Dragon et al. | 250/561 |

*Primary Examiner*—Paul Ip
*Attorney, Agent, or Firm*—Calfee, Halter & Griswold LLP

[57] ABSTRACT

A method and apparatus are provided for controlling the operational characteristics of a motor. The method includes the steps of reading a plurality of optically encoded controller position signals, determining a motor control signal state and differential based thereon and outputting a motor control signal. The central operation of the method and apparatus is based on a motor control signal state diagram and the transitions therein. The apparatus includes a rotary digital optical encoder having a plurality of output signals, a programmable controller device and an output circuit. The programmable controller device includes motor control logic for determining the operational characteristics of a motor. The motor control signal may be either/or a pulse width modulated (PWM) or analog output. Additionally, described embodiments include an apparatus having logic for determining the directional characteristics of a motor.

27 Claims, 11 Drawing Sheets

DIGITAL ROTARY OPTICAL ACCELERATOR

FIELD OF THE INVENTION

The invention relates generally to a motor control device, and, more particularly, to motor control device having a digital rotary optical encoder foot pedal system. The invention further relates to a method of controlling the acceleration and deceleration of a motor through a digital optical encoder system.

BACKGROUND OF THE INVENTION

Electric vehicles, such as electric forklifts, golf carts, street vehicles and other means of transport utilizing electric motor control devices, typically employ what are known as analog foot pedal controllers. A basic component of an analog foot pedal controller is a potentiometer. In its most general sense, a potentiometer is really only a variable electric resistor. In particular, however, an analog potentiometer is an electromechanical device having a terminal connected to each end of a resistive element, and a third terminal connected to a moveable slider contact. An electric input (i.e. voltage) is divided as the moveable slider contact moves over the resistive element, thus making it possible to mechanically change the resistance. In an analog foot pedal controller, a foot pedal is mechanically linked to the moveable slider contact so that displacement of the foot pedal causes a displacement of the moveable slider contact. The displacement of the moveable slider contact then causes a change in the electric output at the third terminal of the potentiometer. This change in electric output is usually then transformed into a motor control signal that is usually a representative voltage signal, hence the term "analog." Additionally, "Hall effect" devices are sometimes also used to generate these representative analog signals. Generally, in a Hall effect device, a magnetic field is applied to a current carrying conductor to create an output voltage. By varying the magnetic field, the output voltage can be varied.

The use of analog potentiometer foot pedals is disadvantageous for several reasons. Firstly, because they depend upon a moveable slider contact to contact a resistive element, they are prone to physical wear and failure. Secondly, due to the nature of their location, i.e. usually at or near the operator's feet, they are prone to contaminates such as dirt or metal shavings from a factory floor that may cause the moveable slider contact to not make contact with the resistive element, or the contaminants may create a false contact in the resistive element leading to a false change in electric output.

Thus, it is apparent that a new type of foot pedal motor controller is desirable to replace the traditional analog potentiometer foot pedal. However, it is still desirable to provide an analog output signal because many new and currently operating vehicle's still employ analog potentiometer foot pedal systems.

SUMMARY OF THE INVENTION

According to the present invention, a method and apparatus is provided for controlling the operational characteristics of a motor. More particularly, the present invention provides a method for controlling the operational characteristics of a motor wherein the method includes the steps of: reading the states of a plurality of optically encoded controller position signals; determining a motor control signal state based on the states of a plurality of optically encoded controller position signals; determining a motor control signal differential based on a transition from a first motor control signal state to a second motor control signal state; modifying the motor control signal based on the motor control signal differential; outputting the motor control signal based on the motor control signal state; and monitoring the motor control signal for a high current condition. The step of modifying the motor control signal based on the motor control signal differential includes the steps of incrementing or decrementing the motor control signal. The step of determining a motor control signal state based on the states of a plurality of optically encoded controller position signals includes the step of determining whether the states of the plurality of optically encoded controller position signals indicate that the optically encoded controller position is an index position. The index position identifies the zero or start position of the controller. The step of outputting a motor control signal based on the motor control signal state includes the step of outputting a pulse width modulated motor control signal. Additionally, or alternatively, the step of outputting a motor control signal based on the motor control signal state includes the step of outputting an analog motor control signal.

The present invention further provides a method for controlling the operational characteristics of a motor. The method includes the steps of: reading the states of a plurality of optically encoded controller position signals; determining a motor control signal state based on the states of a plurality of optically encoded controller position signals; determining a motor control signal differential based on a transition from a first motor control signal state to a second motor control signal state; modifying the motor control signal based on the motor control signal differential; determining a motor control direction based on the states of a plurality of optically encoded controller position signals; outputting a motor control signal based on the motor control signal state; outputting a motor control direction signal based on the motor control direction; and monitoring the motor control signal for a high current condition. The step of modifying the motor control signal based on the motor control signal differential includes the steps of incrementing or decrementing the motor control signal. The step of outputting a motor control signal based on the motor control signal state includes the step of outputting a pulse width modulated motor control signal. Additionally, or alternatively, the step of outputting a motor control signal based on the motor control signal state may include the step of outputting an analog motor control signal. Furthermore, the method employs a conventional motor starter and drive device for physically starting and driving the motor.

The present invention also provides an apparatus for controlling the operational characteristics of a motor. The apparatus includes an optical encoder for optically encoding a position signal; a programmable controller device in circuit communication with the optical encoder and for determining the operational characteristics of the motor; and an output circuit in circuit communication with the programmable controller device and for outputting a second motor control signal. The optical encoder includes a plurality of optical encoder output signals. The programmable controller device includes: an optical encoder input port for reading the plurality of optical encoder output signals; motor control logic for determining the operational characteristics of the motor; and an output port for outputting a first motor control signal. The motor control logic for determining the operational characteristics of the motor comprises logic for determining the directional characteristics of the motor. The first motor control signal includes a pulse width modulated motor control signal. The second motor control signal may be equivalent to the first motor control signal, that is, the output circuit may be a buffer or amplifier circuit which essentially passes the first motor control signal without modification or with amplitude modification. Additionally, the output circuit may be a conversion circuit which outputs a second motor control signal which is based on the first motor control circuit (e.g. PWM to analog converter).

It is therefore an advantage of the present invention to provide a method and apparatus for controlling the operational characteristics of a motor via an optically encoded positioner.

It is a further advantage of this invention to provide a method and apparatus for controlling the operational characteristics of a motor which has the ability to provide a digital (e.g. pulse width modulated output) and/or an analog motor control signal output.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DETAILED DESCRIPTION OF ILLUSTRATED EMBODIMENT

Figure 1A:
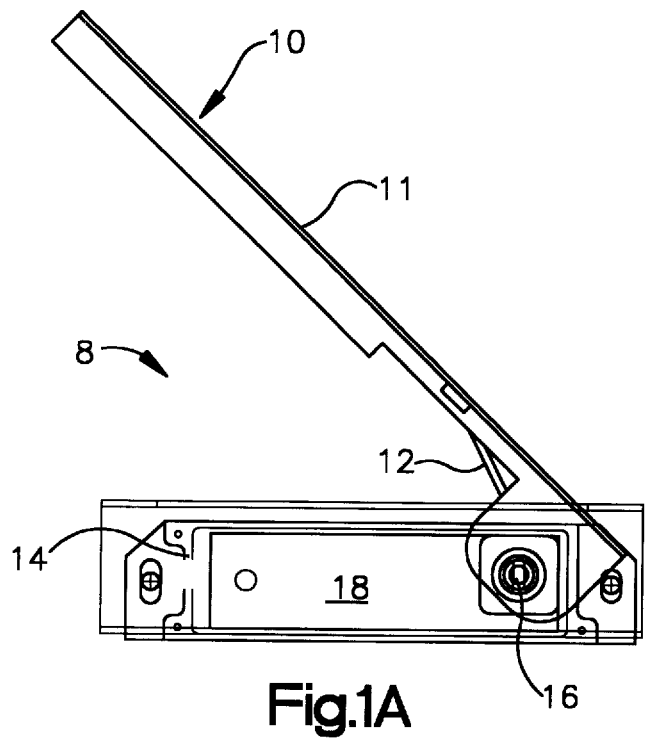
FIGS. 1A, 1B and 1C are illustrations of a digital rotary encoder foot pedal system of the present invention.

Referring now to the drawings, and for the present to FIGS. 1A, 1B and 1C, a digital rotary encoder foot pedal system (hereinafter FP system) embodying the present invention is shown and generally indicated at 8. The FP system includes a foot pedal 10, a base 22, an accelerator assembly unit 18, spring members 12 and 13 and a signal output port 14. The foot pedal 10 is of general construction having a flat surface 11 configured to accept a mechanical force applied by an operator's foot.

The foot pedal 10 includes an aperture for accepting pivot rod or shaft 20 that is in physical communication with the accelerator assembly unit 18. The foot pedal 10 also includes a under surface adapted to be secured by spring members 12 and 13. Spring members 12 and 13 are secured against the foot pedal 10, the pivot rod or shaft 20 and the base 22 such that a resilient assembly is created that always returns the foot pedal 10 to resting home position. The resilient assembly also provides a rotational counter force, via the spring members 12 and 13, against the foot pedal 10 to thereby give the pedal a "feel." By adjusting the tension of the springs, the foot pedal 10 can be given a "heavy" or "light" feel.

Figure 1B:
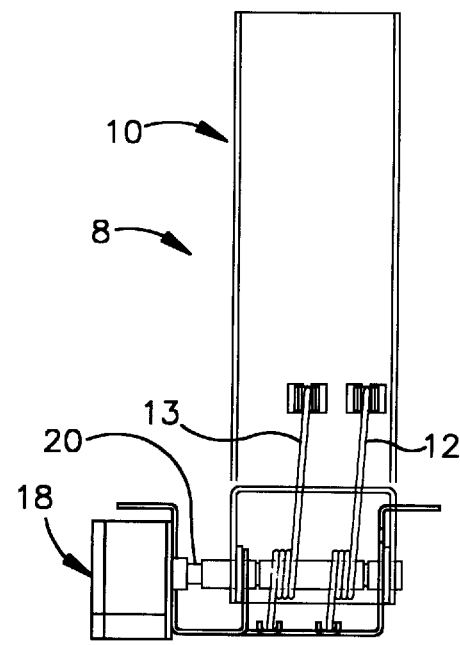
Figure 1C:
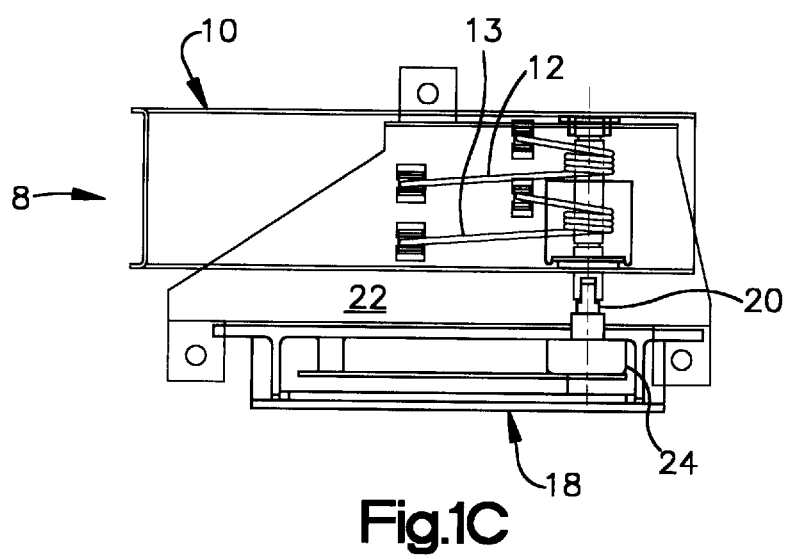

Still referring to FIGS. 1A, 1B and 1C, the pivot rod or shaft 20 is in physical communication with accelerator assembly unit 18. More particularly, the pivot rod or shaft 20 is in physical communication with rotary optical encoder unit 24. The rotary optical encoder unit 24 includes a shaft, housing and mounting assembly. The shaft of the rotary optical encoder unit 24 may be mechanically coupled to pivot shaft or rod 20, or may be integrally constructed thereinto.

In operation, a vehicle operator would place his foot, or a portion thereof, onto surface 11 of foot pedal 10 and apply a force thereto. The applied force would cause foot pedal 10 to be angularly displaced while spring members 12 and 13 provide a rotational counter force to the operator's force. The angular displacement of foot pedal 10 will cause the pivot shaft or rod 20 to experience rotary displacement that is sensed by the rotary optical encoder unit 24 in the accelerator assembly unit 18. The accelerator assembly unit 18 would then translate the rotary displacement into either a digital or analog output signal at signal output port 14. The output signal port 14 includes a flying lead connection device to allow easy and secure connection thereto.

Figures 2, 3:
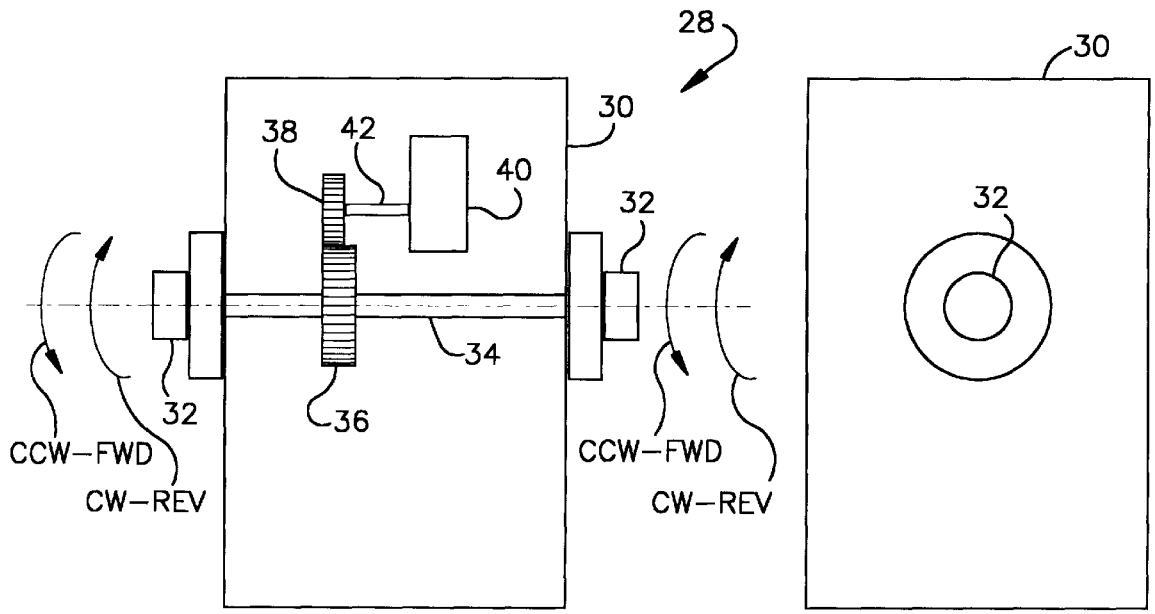
FIGS. 2 and 3 are illustrations of a twist grip controller for used in walkie pallet powered forklifts and other similar walkie controlled vehicles.

Referring now to FIGS. 2 and 3, a controller for use in walkie pallet powered forklifts and other similar walkie controlled vehicles is shown generally at 28. The controller 28 includes an outer housing 30, twist grips 32, internal gearing 36 and 38, shafts 34 and 42 and an accelerator control unit 40. The shaft 34 is in physical communication with the twist grips 32 and gearing 36 and 38. The shaft 42 is in physical communication with an optical encoder within the accelerator control unit 40. The gearing is responsible for associating the rotation of shaft 34 with the rotation of the optical encoder. Therefore, through the proper gear configuration, the shaft 42 may rotate in the opposite or in the same direction of shaft 34. Additionally, the twist directions "CCW-FWD" and "CW-REV" are illustrated.

In operation, the operator can twist or rotate the twist grips 32 in clockwise or counter-clockwise directions to cause either a reverse or forward direction of travel as shown. As the operator continues to incrementally twist the twist grips 32 in the forward direction, the controller 28 will output incrementally differentiated control signals. Typically, this incremental change indicates a change in speed, or an acceleration in the forward direction. If the operator twists or rotates the dial in the REV direction, the controller will output control signals relating to a reverse direction. If the operator continues to incrementally twist the dial 32 in the reverse direction, the controller 28 will once again output incrementally differentiated control signals. This incremental change indicates a change in speed, or an acceleration in the reverse direction. Additionally, a twist in the forward or reverse directions may also generate ON signals which turn ON the devices or systems controlled by controller 28. Generally, after a twist in the forward or reverse direction, the twist grips 32 and rotary optical encoder within the accelerator control unit 40 will return to their home or default locations via a resilient device. When the controller is in the home position, it outputs control signals relating to a stop condition. These control signals include "off" signals which turn off the devices or systems controlled.

The present invention will hereinafter describe four embodiments, with each embodiment directed toward a unique output signal, analog or digital, that is based on industry practice standards. As an overview, a first illustrated embodiment outputs a pulse width modulated (hereinafter PWM) signal to indicate the foot pedal accelerator position to the control system. A second illustrated embodiment outputs a voltage to indicate the foot pedal accelerator position and includes a start switch circuit. A third illustrated embodiment incorporates a voltage output as well as direction indication information. Lastly, a fourth embodiment is described that includes a four bit binary output as the accelerator position. The four illustrated embodiments are all based on the same fundamental encoder process to be presently described hereinafter. Accordingly, a detailed structural description of each embodiment will first be presented, followed by an operational description firstly describing the fundamental encoder process then secondly describing the operation of each illustrated embodiment.

Structural Description

First Illustrated Embodiment: Pulse Width Modulated (PWM) Control System

Figure 4:
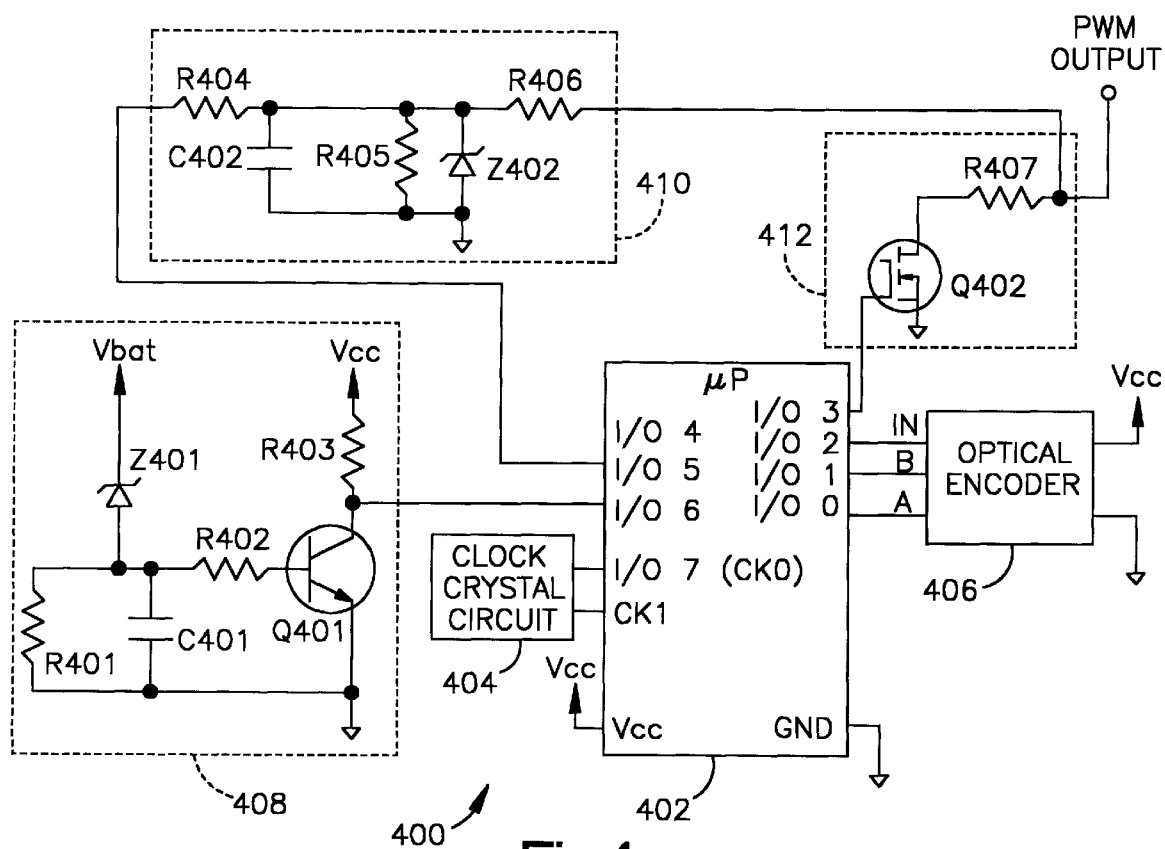
FIG. 4 is a schematic illustration of the certain hardware components of a PWM Control System of the present invention.

Referring now to FIG. 4, a PWM Control System 400 of the present invention is shown. The PWM Control System 400 includes a micro-controller (hereinafter $\mu$C) 402, a clock circuit 404, an optical encoder 406, a calibration control circuit 408, a feedback circuit 410 and a PWM output circuit 412. The $\mu$C 402 is CPU-based with internal RAM, ROM and I/O interface circuitry. One such suitable $\mu$C 402 is the COP8SAA manufactured by NATIONAL SEMICONDUCTOR CORP. The $\mu$C 402 further includes programmable input and output ports I/O 0–I/O 7. Other micro-controllers which include the functions and capabilities to be presently described may also be employed in the alternative to the COP 8SAA.

The $\mu$C 402 is in circuit communication with the optical encoder 406 via optical encoder 406 output channels A, B and index IN that are connected to input ports I/O 0–I/O 2, respectively. The optical encoder 406 is a rotary optical encoder with CMOS and TTL compatible output channels A, B and index IN. The optical encoder 406 output channels A, B and index IN are square wave signal outputs with channels A and B having a phase difference of 90 electrical degrees +/−45 electrical degrees (known as a Quadrature output). The outputs are generated by preconditioned Schmitt trigger photo circuits. Once such suitable optical encoder is 61 H-Series by Grayhill Corp. The output resolution of the optical encoder 406 output will vary based on designer preference and application requirements. However, standard output resolutions of 25 output cycles/shaft revolution up to 256 output cycles/shaft revolution are available.

The $\mu$C 402 is further in circuit communication with calibration control circuit 408 via input port I/O 6. The calibration control circuit 408 includes resistors R401–R403, capacitor C401, zener diode Z401 and NPN transistor Q401. The zener diode Z401 has its cathode terminal connected to voltage $V_{bat}$. When the reverse breakdown voltage of zener diode Z401 is exceeded by $V_{bat}$, transistor Q401 will turn on and cause its collector terminal to output a voltage at ground potential. Therefore, the output at the collector terminal of Q401 will be a logic low input to the $\mu$C 402 input port I/O 6. A logic low input to the $\mu$C 402 input port I/O 6 will cause the $\mu$C 402 to run in normal mode. When $V_{bat}$ is greater than the voltage across Z401, I/O 6 will be logic high and a test mode will begin executing. The details of the test or diagnostic mode will be presently discussed in greater detail in the operational description presented infra.

The PWM output circuit 412 is in circuit communication with the $\mu$C 402 output port I/O 3 and functions to provide a switching/isolation output for $\mu$C 402 output port I/O 3. The PWM output circuit 412 includes transistor Q402 and resistor R407. The $\mu$C 402 output port I/O 3 is in circuit communication with a gate terminal of Q402. The drain terminal of Q402 is connected to resistor R407, which forms the output of the PWM output circuit 412. In the illustrated embodiment, the transistor Q402 is preferably an N-channel MOSFET and the resistor R407 is 12 Ω.

The PWM Control System 400 also includes a feedback circuit 410 for short circuit protection by monitoring the voltage across R407 of PWM output circuit 412. The feedback circuit 410 is in circuit communication with the $\mu$C 402 input port I/O 5. The feedback circuit 410 includes resistors R404–R406, capacitor C402 and zener diode Z402. Resistors R405 and R406 form a voltage divider circuit whose voltage appears at input port I/O 5 through isolation resistor R404. The zener diode Z402 is connected in parallel across R405 to ensure that the voltage across R405 does not exceed the allowable input voltage for input port I/O 5 of the $\mu$C 402. In the illustrated embodiment, resistor R404 and R405 are 10 kΩ and resistor R406 is 18 kΩ. The zener diode Z402 includes a reverse breakdown voltage of 5.6 volts and capacitor C402 is 4700 pF. Table 1 illustrates the PWM duty cycle output of the system 400 of FIG. 4 with respect to positional changes of the optical encoder and thereby, the foot pedal.

TABLE 1

| PWM Duty Cycle | |
| --- | --- |
| Position | PWM Duty Cycle (%) |
| 0 | 10.1 |
| 1 | 17.6 |
| 2 | 22.6 |
| 3 | 27.6 |
| 4 | 32.6 |
| 5 | 37.6 |
| 6 | 42.6 |
| 7 | 47.6 |
| 8 | 52.6 |
| 9 | 57.6 |
| 10 | 62.6 |
| 11 | 67.6 |
| 12 | 72.6 |
| 13 | 77.6 |
| 14 | 82.6 |
| 15 | 87.6 |

Second Illustrated Embodiment: PWM-Based Analog Voltage Control System

Figure 5:
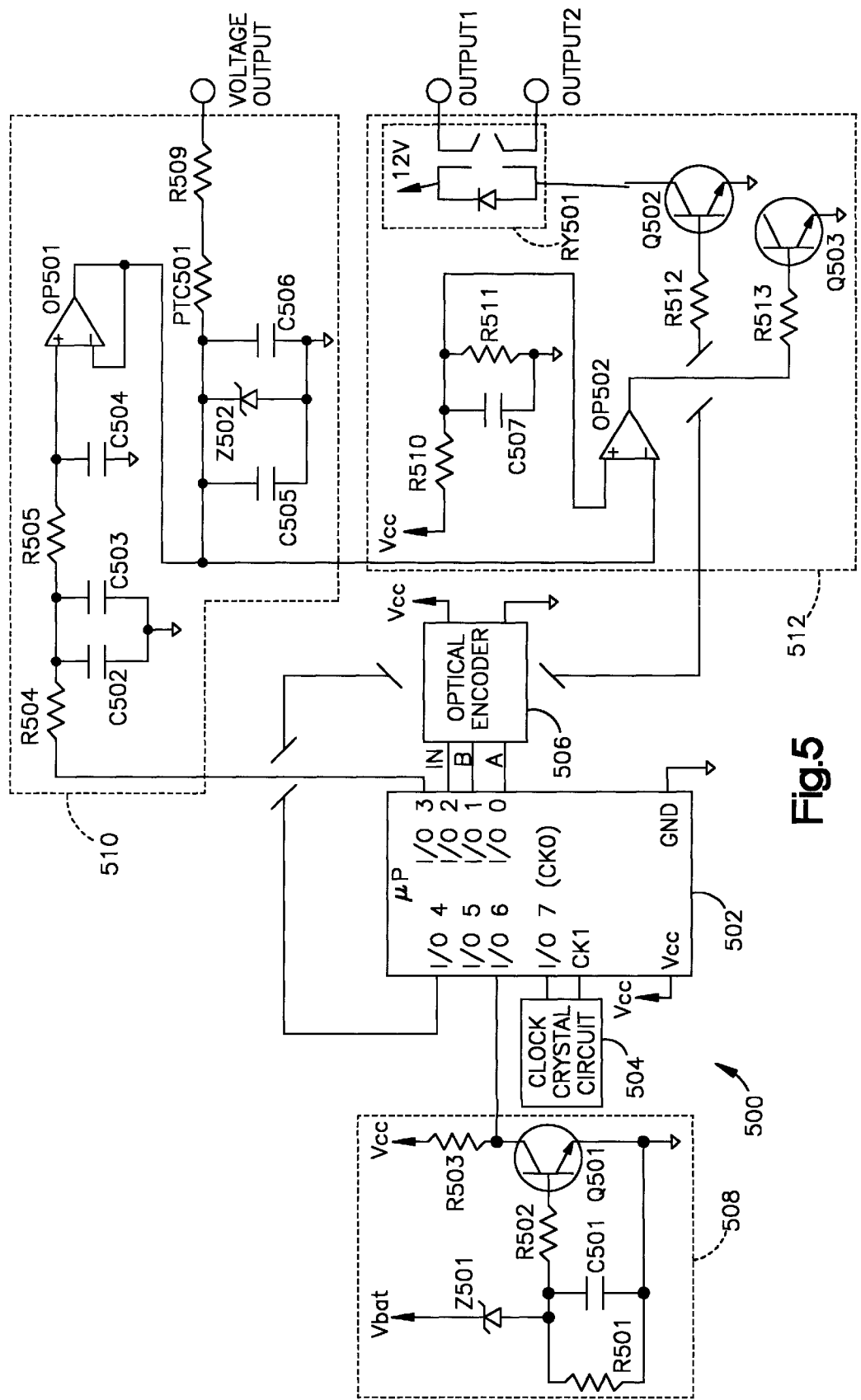
FIG. 5 is a schematic illustration of the certain hardware components of a PWM-based Analog Voltage Control System of the present invention.

Referring now to FIG. 5, a PWM-based Analog Voltage Control System 500 of the present invention is shown. The PWM-based Analog Voltage Control System 500 includes a $\mu$C 502, a clock circuit 504, an optical encoder 506, a calibration control circuit 508, a PWM filter circuit 510 and a start switch circuit 512. The µC 502 is identical to the µC 402 shown in FIG. 4, except for the control logic (to be presently described), and is described in the text associated with that figure and hence will not be further described in detail. The µC 502 is in circuit communication with the optical encoder 506 via optical encoder 506 output channels A, B and index IN that are connected to input ports I/O 0–I/O 2, respectively. The optical encoder 506 is identical to the optical encoder 406 shown in FIG. 4 and described in the text associated with that figure and hence will not be presently described in detail. The µC 502 is further in circuit communication with calibration control circuit 508 via input port I/O 6. The calibration control circuit 508 identical to the calibration control circuit 408 shown in FIG. 4 and described in the text associated with that figure and hence will not be presently described in detail.

The PWM filter circuit 510 is in circuit communication with the µC 402 output port I/O 3 and functions to filter a PWM signal into a DC voltage signal. The PWM filter circuit 510 includes resistors R504–R509, capacitors C502–C506, zener diode Z502 and operational amplifier OP501. Resistors R504–R505 and capacitors C502–C504 serve as filtering elements while operational amplifier OP51 provides the appropriate gain and isolation. Resistors R507–R509 serve to further isolate and buffer the voltage output. A cathode of zener diode Z502 is in circuit communication with the voltage output while its anode is connected to ground. Zener diode Z502 serves as an element in a short circuit protection circuit to ensure that the voltage output does not exceed a predefined voltage. Other elements of the short circuit protection circuit are PTC 501 and Z502. PTC 501 is a PTC (Positive Temperature Coefficient) thermistor. In a PTC thermistor, resistance through the device increases as temperature increases. Zener diode Z502 has a reverse breakdown voltage of 5.6 volts and maintains that voltage until the resistance of PTC 501 increases. Operational amplifier OP501 is an LM2902 low power quad operational amplifier manufactured by NATIONAL SEMICONDUCTOR. However, other suitable operational amplifiers may also be employed. While the above hardware has been described with some specificity, it should be apparent that numerous combinations of resistor, capacitor and diode values may be employed while still maintaining the overall functionality of the described hardware.

The start switch circuit 512 is in circuit communication with the µC 502 output port I/O 4 and the PWM filter circuit 510. The start switch circuit 512 is provided by the present invention because certain motor control systems require an integral motor starter signal with a foot pedal accelerator system. One such manufacturer that requires such a motor start signal is General Electric Corp. Therefore, in order to assure compatibility with such systems, the present invention provides a start switch circuit 512 suitable for such motor controllers.

The start switch circuit 512 includes resistors R510–R513, capacitor C507, transistors Q502 and Q503, operational amplifier OP502 and relay RY501. Resistors R510 and R511 and capacitor C507 form a voltage divider circuit whose voltage is input to operational amplifier OP502. Operational amplifier OP502 is configured as a comparator with the PWM-based voltage output of PWM filter circuit 510 as a second input. The output of OP502 is in circuit communication with the gate terminal of Q503 through resistor R513. The µC 502 output port I/O 4 is in circuit communication with the gate terminal of Q502 through resistor R512 and the collector terminal of Q502.

If the voltage divider input to OP502 is greater than the PWM-based voltage output, OP502 will output a logic high signal to the gate terminal of Q503. A logic high signal at gate terminal of Q503 will turn Q503 "on" and cause the ground potential at the emitter terminal of Q503 to appear at its collector terminal. A ground potential at the collector terminal of Q503 will, in effect, disable Q502 and ensure that Q502 is in the "off" state thereby not pulling in relay RY501. If the voltage divider input to OP502 is less than the PWM-based voltage input, OP502 will output a logic low signal to the gate terminal of Q503. A logic low signal to the gate terminal of Q503 places Q503 in the "off" state to thereby allow the gate terminal of Q502 to be controlled by the µC 502 output port I/O 4. Accordingly, a logic high signal on the µC 502 output port I/O 4 will cause Q502 to turn "on" and thereby pull-in relay RY501. When relay RY501 is pulled-in, a switch closes and output terminals OUTPUT1 and OUTPUT2 are placed in circuit communication with each other thereby providing a start signal to the motor control system. Relay RY501 is debounced via a timed loop which is generated by the control logic of the µC and maintains the relay state until the foot pedal accelerator reaches a predetermined position. A detailed description of the hysteresis loop and the relay RY501 de-bouncing will presented in the operation discussion of this illustrated embodiment, infra. In the illustrated embodiment, the resistor R510 is 10 kΩ, R511 is 390 Ω, R512 is 1.8 kΩ, R513 is 3.3 kΩ and capacitor C507 is 0.01 µF. The operational amplifier OP502 is an LM2902 low power quad operational amplifier manufactured by NATIONAL SEMICONDUCTOR and the transistors Q502 and Q503 are NPN transistors. The RY501 coil voltage is preferably 12 volts and therefore $V_{RY}$ is preferably also 12 volts. Table 2 illustrates the PWM duty cycle, encoder positional relation and approximate system 500 voltage output.

TABLE 2

| PWM-based Analog Voltage Output | | |
|---|---|---|
| Position | PWM Duty Cycle (%) | Approx. Voltage (V) |
| 0 | 70.0 | 3.57 |
| 1 | 67.0 | 3.37 |
| 2 | 65.5 | 3.29 |
| 3 | 62.8 | 3.16 |
| 4 | 59.3 | 2.99 |
| 5 | 56.5 | 2.84 |
| 6 | 54.0 | 2.72 |
| 7 | 53.0 | 2.67 |
| 8 | 51.3 | 2.58 |
| 9 | 49.5 | 2.49 |
| 10 | 48.0 | 2.41 |
| 11 | 45.0 | 2.26 |
| 12 | 40.0 | 2.00 |
| 13 | 32.8 | 1.61 |
| 14 | 9.4 | 0.47 |
| 15 | 9.4 | 0.47 |

Third Illustrated Embodiment: PWM-Based Voltage Control System with Direction Indication Referring now to FIG. 6A, a PWM-based Voltage Control System with direction indication 600 of the present invention is shown. The PWM-based Voltage Control System 600 with direction indication outputs is generally used in walkie pallet powered forklifts and other similar walkie controlled vehicles and relates to the controller illustrated in FIGS. 2–3. However, the PWM-based Voltage Control System 600 may be used in any application that requires direction indication outputs. The PWM-based Voltage Control System 600 includes a µC 602, a clock circuit 604, an optical encoder 606, a calibration control circuit 608, a PWM filter circuit 610 and a direction indication circuit 612. The µC 602 is identical to the μC 402 shown in FIG. 4, except for the control logic, and is described in the text associated with that figure and hence will not be presently described in detail.

The μC 602 is in circuit communication with the optical encoder 606 via optical encoder 606 output channels A, B and index IN that are connected to input ports I/O 0–I/O 2, respectively. The optical encoder 606 is identical to the optical encoder 406 shown in FIG. 4 and described in the text associated with that figure and hence will not be presently described in detail. The μC 602 is further in circuit communication with calibration control circuit 608 via input port I/O 6. The calibration control circuit 608 identical to the calibration control circuit 408 shown in FIG. 4 and described in the text associated with that figure and hence will not be presently described in detail. The μC 602 is also in circuit communication with PWM filter circuit 610 via output port I/O 3. The PWM filter circuit 610 identical to the PWM filter circuit 510 shown in FIG. 5 and described in the text associated with that figure and hence will not be presently described in detail.

The direction indication circuit 612 is in circuit communication with the μC 602 output ports I/O 4 and I/O 5. The direction indication circuit 612 includes transistors Q602 and Q603. The gate terminal of Q602 is in circuit communication with output port I/O 5 and the gate terminal of Q603 is in circuit communication with output port I/O 4. The drain terminal of Q602 forms the direction indication output REVERSE and the drain terminal of Q603 forms the direction indication output FORWARD. Transistors Q602 and Q603 perform a switching/isolation function for output ports I/O 4 and I/O 5.

When a logic high signal is present at output port I/O 4, transistor Q603 will enter an "on" state and cause the ground potential present at its source terminal to appear at its drain terminal, thereby causing the direction indication output FORWARD to be a logic low signal. When a logic low signal is present at the output port I/O 4, transistor Q603 will enter an "off" state whereby the ground potential at the source terminal will not be seen at the drain terminal of Q603. Transistor Q602 operates in a similar manner to transistor Q603 and therefore will not be presently discussed. However, it should be noted that Q603 and Q602 are never both in the "on" state. In the illustrated embodiment, transistors Q602 and Q603 are N-channel MOSFETs. The PWM-based Voltage Control System 600 with direction indication outputs also includes short circuit protections elements PTC 601, PTC 602, R612 and R613. The PTC's 601–603 are PTC (Positive Temperature Coefficient) thermistors. They provide the same function of short circuit as PTC 501 of FIG. 5.

The PWM-based Voltage Control System 600 with direction indication also includes a starter output circuit 614. The starter output circuit 614 includes resistors R610 and R611, capacitor C607 and operational amplifier OP602. Resistors R610 and R611 and capacitor C607 form a voltage divider circuit whose voltage is input to operational amplifier OP602. Operational amplifier OP602 is configured as a comparator with the PWM-based voltage output of PWM filter circuit 610 as a second input. The output of OP602 is presently not in circuit communication with any motor control circuit. However, the starter output circuit 614 may be employed in the same manner as the start switch circuit 512 of FIG. 5 if the requirements of a particular design necessitate such circuitry. In such a case, the physical configuration of starter circuit 614 would be identical to the start switch circuit 512 of FIG. 5. The starter output circuit 614 is included for purposes of commonizing a printed circuit board design for all four embodiments. Therefore, it is possible that specialized printed circuit board may be designed for each embodiment that excludes un-utilized circuitry by the specific embodiment.

Fourth Illustrated Embodiment: 4-Bit Output

Figure 6A:
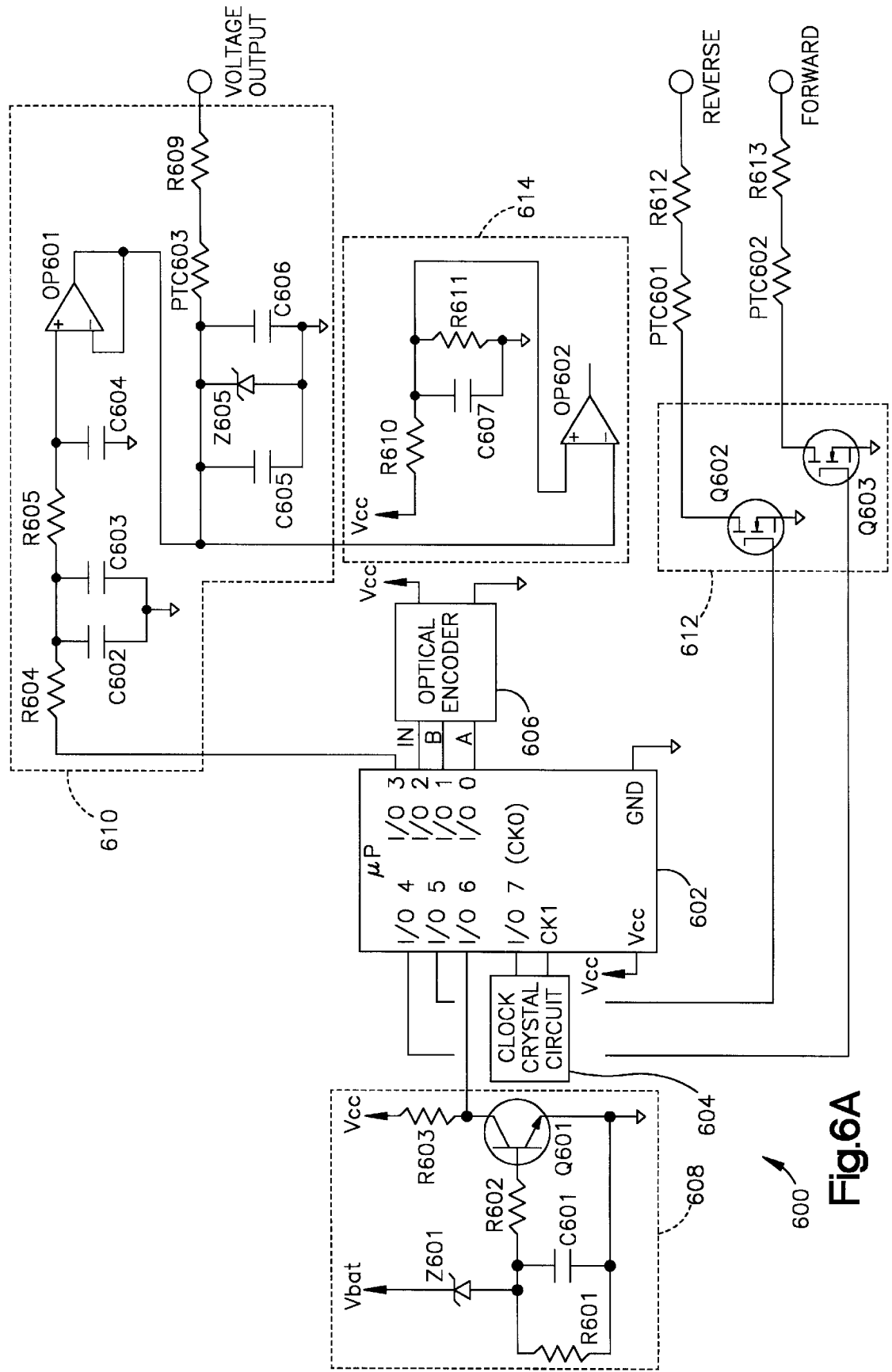
FIG. 6A is a schematic illustration of certain hardware components of a PWM-Based Voltage Control System with Direction Indications of the present invention.
Figure 6B:
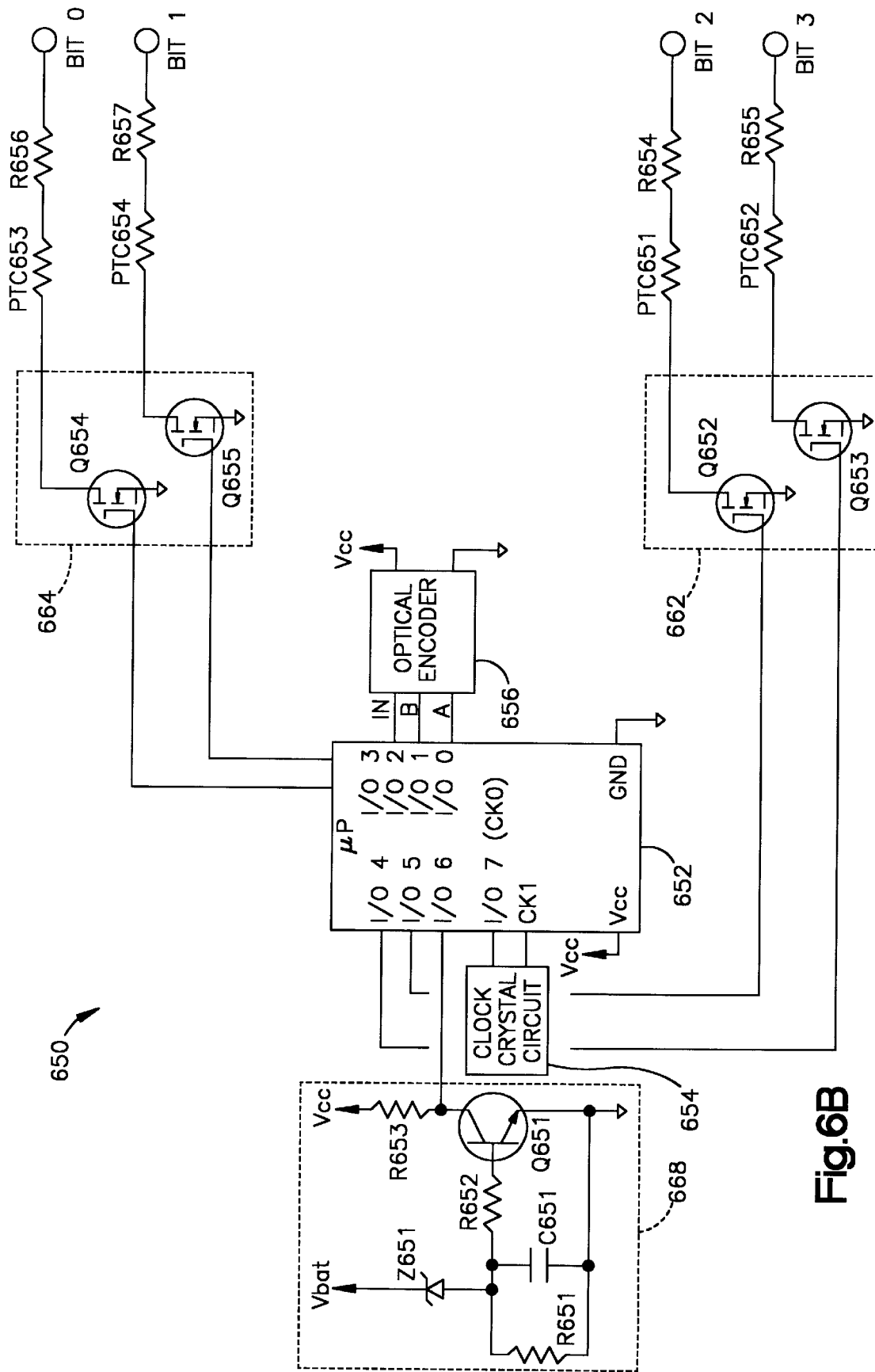
FIG. 6B is a schematic illustration of certain hardware components of a 4-Bit Output Control System of the present invention.

Illustrated in FIG. 6B is 4-Bit Output Control system 650. The 4-Bit Output Control system 650 includes a μC 652, a clock circuit 654, an optical encoder 656, a calibration control circuit 658 and bit output circuits 662 and 664. The μC 652 is identical to the μC 402 shown in FIG. 4, except for the control logic, and is described in the text associated with that figure and hence will not be presently described in detail.

The μC 652 is in circuit communication with the optical encoder 656 via optical encoder 656 output channels A, B and index IN that are connected to input ports I/O 0–I/O 2, respectively. The optical encoder 656 is identical to the optical encoder 406 shown in FIG. 4 and described in the text associated with that figure and hence will not be presently described in detail. The μC 662 is further in circuit communication with calibration control circuit 668 via input port I/O 6. The calibration control circuit 668 identical to the calibration control circuit 408 shown in FIG. 4 and described in the text associated with that figure and hence will not be presently described in detail.

The bit output circuits 662 and 664 are in circuit communication with the μC 652 output ports. The bit output circuit 662 transistors Q652 and Q653. The gate terminal of Q652 is in circuit communication with a first (I/O 5) output port of the μC 652 and the gate terminal of Q653 is in circuit communication with a second output port (I/O 4). The drain terminal of Q652 forms the BIT 2 output and the drain terminal of Q653 forms the BIT 3 output. Transistors Q652 and Q653 also perform a switching/isolation function for output ports I/O 4 and I/O 5.

When a logic high signal is present at output port I/O 4, transistor Q653 will enter an "on" state and cause the ground potential present at its source terminal to appear at its drain terminal, thereby causes BIT 3 to be a logic low signal. When a logic low signal is present at the output port I/O 4, transistor Q653 will enter an "off" state whereby the ground potential at the source terminal will not be seen at the drain terminal of Q653. Transistor Q652 operates in a similar manner to transistor Q653 and therefore will not be presently discussed. Similarly, bit output circuit 664 operates in like manner to bit output circuit 662 and will not be further discussed. In the illustrated embodiment, transistors Q652, Q653, Q654 and Q655 are N-channel MOSFETs. The 4-Bit Output Control System 650 also includes short circuit protections elements PTC 651-4 and R654-7. PTC 651-4 are PTC (Positive Temperature Coefficient) thermistors and provide the same function of short circuit as PTC 501 of FIG. 5.

In all of the illustrated embodiments, the voltage Vcc is provided by a voltage regulator circuit. Since voltage regulator circuits are well-known in the art, a description of such a voltage regulator circuit will not be presented. Additionally, in all of the illustrated embodiments, the voltage Vcc is preferably 5 volts. Moreover, the following discussion will refer to the incrementing or decrementing of the μC output signal. Any and all references to incrementing and decrementing of the μC output signal refer to the process of changing the state of an output quantity. For example, incrementing may refer to the changing state of a duty cycle wherein the duty cycle is incremented or decremented depending on the context of the invention. Similarly, decrementing may also refer to the changing state of a duty cycle wherein the duty cycle is incremented or decremented depending on the context of the invention. Moreover, the terms incrementing and decrementing may also refer to the changing states of an analog or digital voltage signal. The structural description of the illustrated embodiments having been introduced and described, the present discussion will now relate the described structures to the operational characteristics of the present invention.

Operational Characteristics

Figure 7:
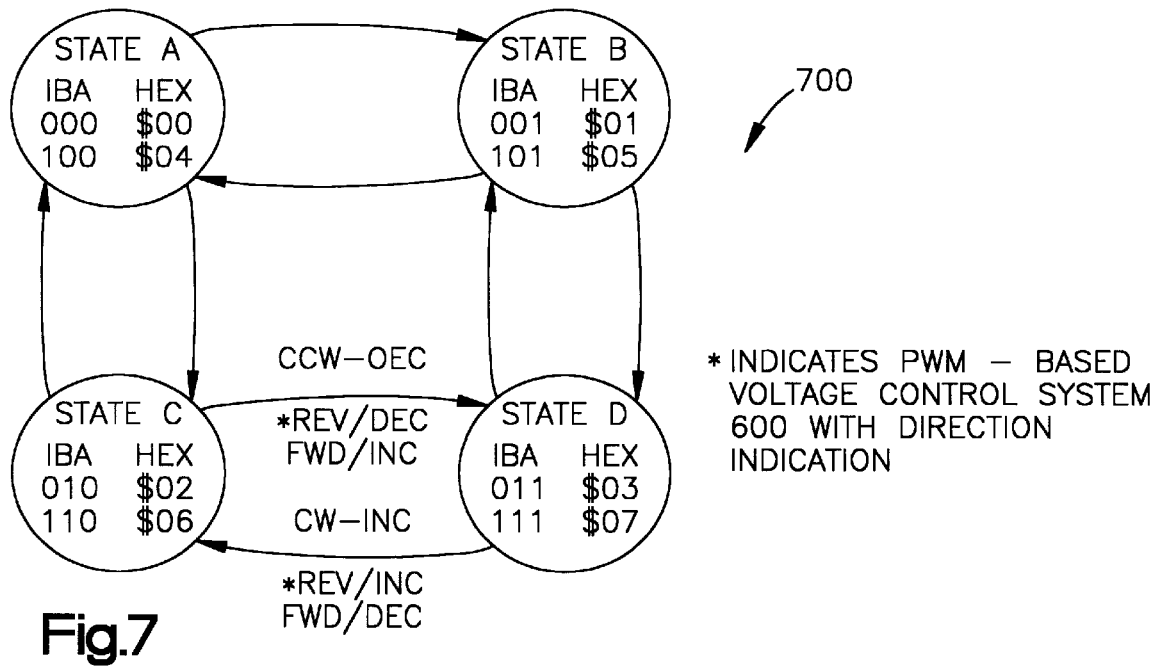
FIG. 7 is a state diagram illustrating the various motor control signal states and their transition paths of the present invention.

The operational characteristics of the present invention are based on a state diagram and the transitions between the states therein. Referring now to FIG. 7, a state transition diagram 700 is shown which indicates how the $\mu$C of the present invention interprets the optical encoder output signals I, B, and A. In particular, the state transition diagram 700, with the states and transitions indicated therein, determines the direction and the incrementing and decrementing of the $\mu$C output, and therefore, the foot pedal or twist grip position. The state transition diagram 700 includes four states: STATE A, STATE B, STATE C and STATE D. Each STATE, in state transition diagram 700, is shown with reference to the optical encoder's output channel's states and their hexadecimal equivalents. Each state corresponds to one of two optical encoder output states, and therein, the optical encoder output state shall be defined by the state of the index signal I. The index signal I identifies the zero or start position of the encoder. For example, STATE A is defined by the optical encoder output states of index I=0, channel B=0, channel A=0 (i.e., 000 or Hexadecimal $00). STATE A is also defined by the optical encoder output states of index I=1, channel B=0 and channel A=0 (i.e., 100 or Hexadecimal $04). The STATES B, C and D are similarly defined.

Referring now to FIGS. 1A, 1B, 1C, 7 and 8, the encoder output signals index I, A and B are shown for clockwise transitions of the state diagram 700 (e.g., STATES C to A, A to B, etc.) for the foot pedal system 8. A clockwise transition in the state diagram 700 is interpreted by the $\mu$C as an incremental change in the foot pedal from its previous position (i.e. a depression of the foot pedal to indicate acceleration). A description of the various state transitions and their meanings with respect to a clockwise transition in the state diagram 700 will now be presently discussed. In particular, the index I output of the optical encoder indicates when the optical encoder is in the zero position. When the index I output of the optical encoder is low (hereinafter "0"), the $\mu$C outputs a zero position. If the index I output of the optical encoder is high (hereinafter "1") and a SRO (Static Return to Off, to be presently described) has occurred, the $\mu$C increments or decrements according to the state transitions indicated by the encoder output channels A, B and index I. Upon a transition of the index signal from a "0" to a "1," the $\mu$C begins to look for a next state.

Figure 8:
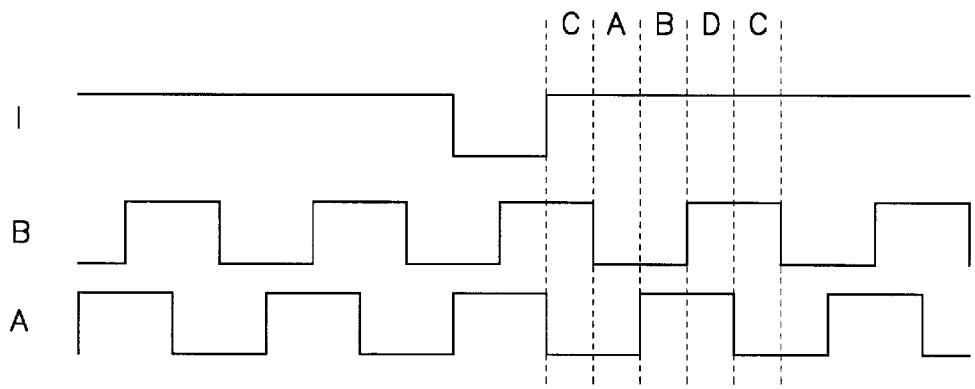
FIGS. 8 and 9 illustrate the optical encoder output signal waveforms and their corresponding states.

The next state after the encoder output index I transitions from 0 to 1 will be I=1, B=1 and A=0 (hereinafter 110), or STATE C. Therefore, STATE C indicates a change from the rest position has occurred. As shown in FIG. 8, the next state indicated by the optical encoder's output channels is 100, or STATE A. A transition from STATE C to STATE A occurs along the "CW INC" path of the state diagram 700. Any state transitions occurring along the clockwise "CW INC" transition path will cause the $\mu$C to increment its output signal to indicate that the there has been an incremental change in the foot pedal position. Therefore, as shown in FIG. 8, the next state encountered by the $\mu$C is defined as STATE B, which entails a transition from STATE A along the clockwise "CW INC" transition path. As described above, the $\mu$C will then increment its output to indicate that there has been an incremental change in the foot pedal position. A similar analysis is applicable to the state transitions from STATES B to D and D to C. Accordingly, as long as clockwise transitions are occurring along the "CW INC" transition path, the $\mu$C will increment its output to indicate that there has been an incremental change in the foot pedal position. There are maximum positions defined for each accelerator, after which, there is no change in position output although the $\mu$C still determines the incremental change.

Still referring to FIGS. 7 and 8, the state diagram 700 transitions and the encoder output signals index I, A and B will now be described for counter clockwise transitions (e.g., STATES B to A, A to C, etc.). A counter clockwise transition in the state diagram 700 is interpreted by the $\mu$C as a decremental change in the foot pedal from its previous position (i.e., a releasing of the foot pedal to indicate deceleration). Assume, as described above, the foot pedal position has incrementally changed so that the optical encoder output signal states are presently described by STATE C (i.e., 110). A transition from STATE C to STATE D can occur only along a counter clockwise transition path "CCW DEC." The $\mu$C interprets all counter clockwise transitions along the "CCW DEC" path as decremental changes in the foot pedal from its previous position and will accordingly decrement its output signal. Therefore, the state transitions from STATE D to STATE B, STATE B to STATE A, etc., will all occur along counter clockwise transition paths in the state diagram 700. Consequently, the $\mu$C will decrement its output for each transition until a predetermined value is reached that is indicative of the foot pedal returning to its home position.

In operation, however, an operator will typically depress and release the foot pedal as needed by the task he is performing (e.g. driving a tow-lift). Therefore, the $\mu$C will increment and decrement as indicated by the foot pedal's optical encoder output signal states. Though the present invention has defined clockwise and counter clockwise transitions according to particular conventions, it should be apparent to those skilled in the art that the other conventions may be employed. For example, clockwise transitions may represent decrementing of output position and counter clockwise transitions may represent incrementing of positions.

Figure 9:
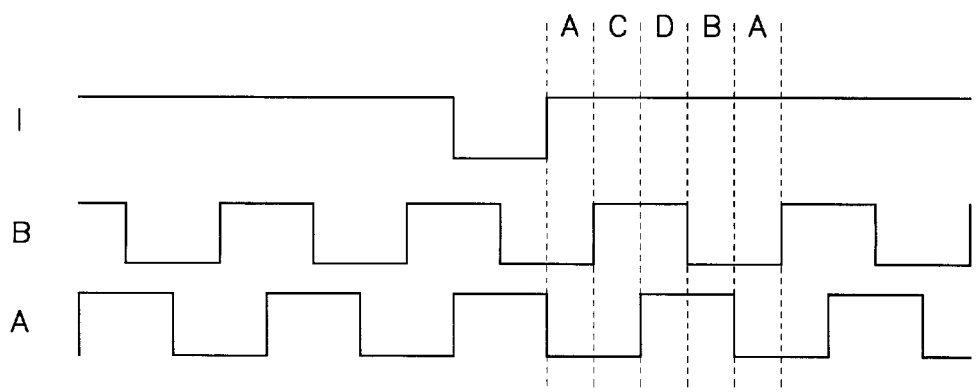

Referring now to FIGS. 2, 3, 7, 8 and 9, an operation description of the controller 28 which allows forward "FWD" acceleration and deceleration and reverse "REV" acceleration and deceleration will be presented. FIGS. 2 and 3 illustrate the controller 28 physical components. FIGS. 7, 8 and 9 illustrate the state transitions and the optical encoder output signal states related thereto. Additionally, FIG. 8 represents the optical encoder output signal states with relation to a forward "FWD" directional turn of the controller 28 and FIG. 9 represents the optical encoder output signal states with relation to a reverse "REV" directional turn of the controller 28.

More particularly, the index I output of the optical encoder indicates when the optical encoder is in the zero position. When the index I output of the optical encoder is low (hereinafter "0"), the $\mu$C outputs a zero position. If the index I output of the optical encoder is high (hereinafter "1"), the $\mu$C increments or decrements according to the state transitions indicated by the encoder output channels A, B and index I. Upon a transition of the index signal from a "0" to a "1," the $\mu$C begins to look for a next state. This next state will indicate a direction (i.e., forward "FWD" or reverse "REV".) Referring to FIG. 8, the first state after the index I has transitioned from 0 to 1 is STATE C, which indicates a forward "FWD" direction. Referring to FIG. 9, the first state after the index I has transitioned from 0 to 1 is STATE A, which indicates a reverse "REV" direction. It should be noted that, however, because the optical encoder includes an output waveform tolerance of +/−45 electrical degrees, the first state encountered may not always be STATE C or STATE A As shown in FIGS. 7, 8 and 9, the optical encoder output signals will transition through a plurality of states. In the case of the forward "FWD" direction, as illustrated by the optical encoder output signal states shown in FIG. 8, the convention adopted by the state diagram 700 is that a clockwise transition from state to state causes the $\mu$C to decrement its output signal while a counter clockwise transition from state to state causes the $\mu$C to increment its output signal. In the case of a reverse "REV" direction, as illustrated by the optical encoder output signal states shown in FIG. 9, the convention adopted by the state diagram 700 is that a clockwise transition from state to state causes the $\mu$C to increment its output signal while a counter clockwise transition from state to state causes the $\mu$C to decrement its output signal. Once again, it should be noted though the present invention has defined clockwise and counter clockwise transitions according to particular conventions, it should be apparent to those skilled in the art that the other conventions may be employed.

Figure 10:
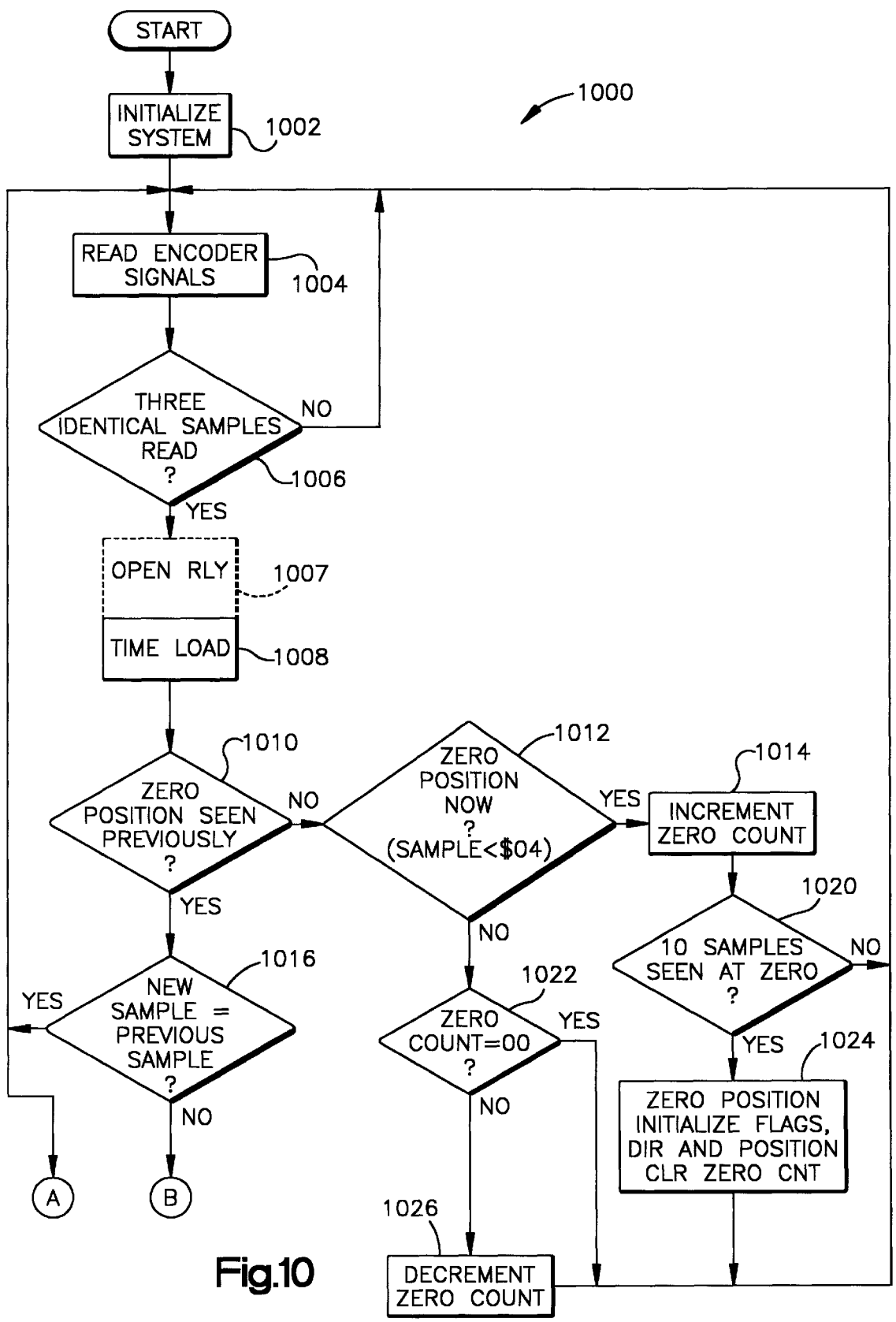
FIGS. 10–11 are flowcharts illustrating a PWM and 4-Bit Output Control Logic of the present invention.
Figure 11:
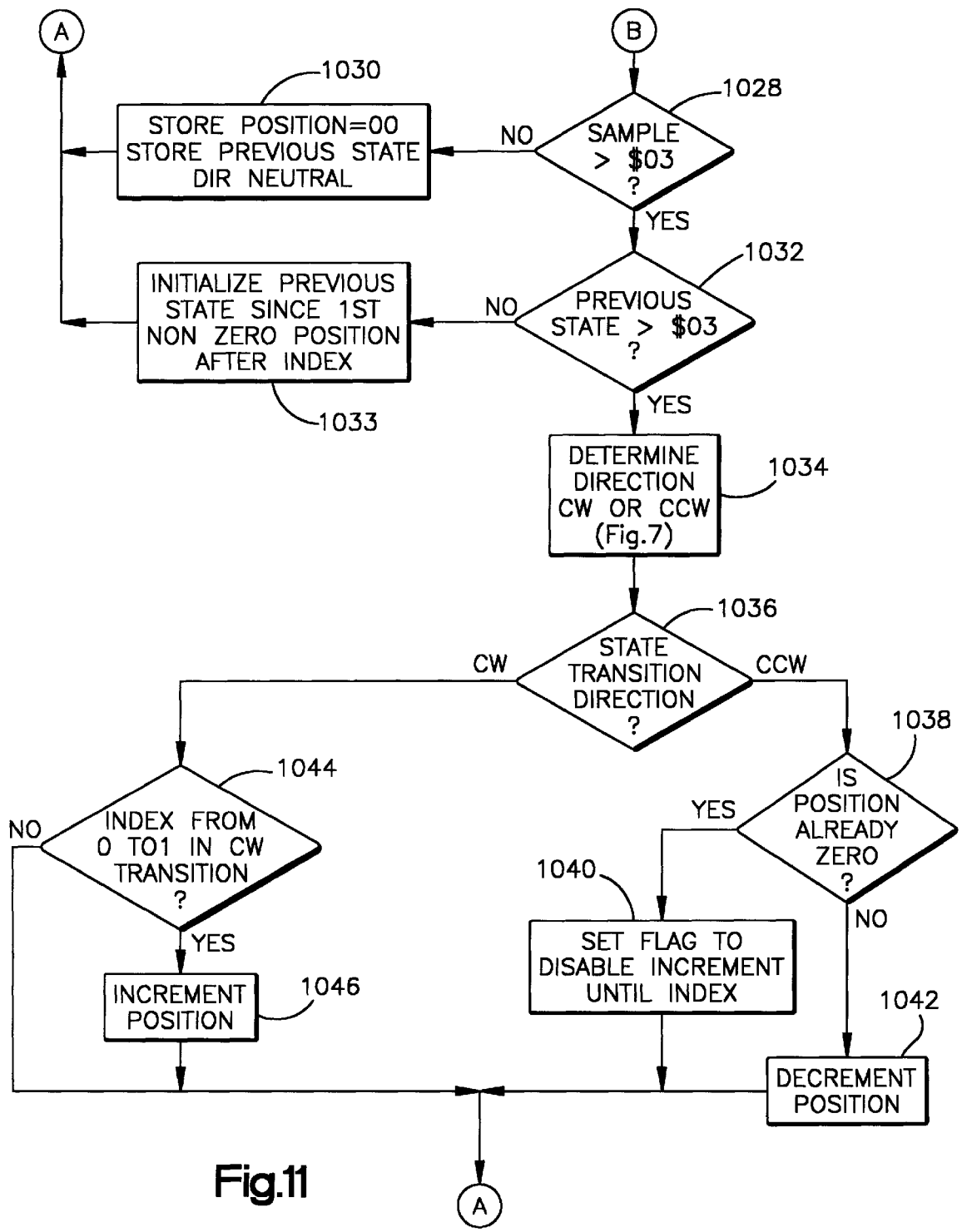

Referring now to FIGS. 1A–1C, 4, 7, 8, 10 and 11, an operational description of the PWM Control System 400 of FIG. 4 will be presented. FIGS. 1A–1C illustrate the physical features of the foot pedal control system, FIG. 4 illustrates the hardware features of the system, FIGS. 7 and 8 illustrate the applicable optical encoder output signal states and transitions and FIGS. 10 and 11 illustrate the $\mu$C control logic. Referring now to FIGS. 10–11, a flowchart illustrating the PWM and 4-Bit Output Control Logic (hereinafter PWM control logic) 1000 of the present invention is shown.

More particularly, the PWM control logic begins in step 1002 where the system is initialized. System initialization includes setting all system variables to their default states and assuring that system power is adequate and stable. After step 1002, the PWM control logic advances to step 1004 where the $\mu$C 402 reads the rotary optical encoder 406 output signals index IN, A and B (hereinafter collectively SAMPLE or sample). After step 1004, the PWM control logic advances to step 1006. In step 1006, the PWM control logic tests to determine if three identical samples have been read into the $\mu$C 402 from the rotary optical encoder 406. This is done for purposes of noise immunity, i.e. to reduce the possibility of an erroneous input to $\mu$C 402 due to noise. If three identical samples have not been read, then the PWM control logic loops back to step 1004. If three identical samples have been read, then the PWM control logic advances to step 1008. The sample is stored in memory during steps 1004 and 1006.

In step 1008, the PWM control logic sequentially loads the "on" and "off" time of the pulse-width modulated output of $\mu$C 402 into an "auto reload" register for the $\mu$C 402 timer. The "on" or "off" time determined from the rotary optical encoder 406 position and is taken from a table programmed into the $\mu$C 402 software. Throughout the entire operation of the PWM control logic, a software independent interrupt occurs which loads the "on" or "off" time from the reload register into the timer register of the $\mu$C 402. It should be noted that this "auto reload" function is specific to some micro-controllers and not to others. It should be further noted that an auto reload register is not required to implement the pulse-width modulated output of the present invention and that conventional programming logic may be employed in other micro-controllers to arrive at the same function.

In step 1008, the software independent interrupt monitors the output of Q402 for a short circuit and shuts down the $\mu$C 402 if necessary. After step 1008, the PWM control logic advances to step 1010. In step 1010, a zero position variable is tested to determine if the zero position (herein after index position I=0) has been input from the rotary optical encoder 406 to the $\mu$C 402 at least 10 times. The quantity of "10" samples may change based the system timing requirements and noise immunity characteristics. For example, if design criteria indicates that a quick system response time is required, less than 10 samples may be used. Similarly, if the design criteria indicates that a quick system response time is not required, more than 10 samples may be used. Similar type adjustments may be made based on noise immunity.

In the illustrated embodiment, the test state of the zero position variable changes after 10 index position samples (i.e. zero position samples) have been read (i.e. I=0). If the index position has not been read 10 times, the PWM control logic advances to step 1012. In step 1012, the PWM control logic tests the current sample reading to determine if the rotary optical encoder 406 is currently in the index position (SAMPLE<$04).

If the current sample is in the index position, then the PWM control logic advances to step 1014 where a zero position counter is incremented. After step 1014, the PWM control logic advances to step 1020. In step 1020, the zero position counter is tested to determine whether 10 index position samples have been read. If not, then the PWM control logic loops back to step 1004 and reads new samples. If 10 index position samples (i.e. zero position samples) have been read, indicating a true zero position, then the PWM control logic advances to step 1024. In step 1024, the PWM control logic initializes direction (DIR) and position flags to predetermined initialization values. The DIR flags are specific to the logic of the PWM Voltage Control System 600 with direction indication outputs (illustrated in FIG. 6A). For example, DIR will typically be neutral, forward or reverse and position is typically the index position, or zero position, "00" or some other value indicative of a zero position. At initialization in all embodiments, DIR is set to neutral and position is set to zero. After step 1024, the PWM procedure loops back to step 1004 where new samples are read.

If the current sample is not in the index position, in step 1012, then the PWM control logic advances to step 1022. In step 1022, the zero position counter is tested to determine if its count is equal to zero. If the zero count is not equal to zero, then the PWM control logic advances to step 1026 where the zero position counter is decremented. If the zero position counter is equal to zero, the PWM control logic loops back to step 1004.

If, in step 1010, the test of step 1020 has been satisfied (i.e., (SRO) 10 index position samples have been read), the PWM control logic advances to step 1016. In step 1016, the PWM control logic tests the new sample to determine if it is equal to the previous sample. If the samples are identical, then the PWM control logic does not need to modify the PWM output of the $\mu$C 402 and therefore loops back to step 1004 for new sample readings. This condition indicates that the foot pedal, and therefore the optical encoder, have not been physically moved.

If, in step 1016, the new sample is not equal to the previous sample, the PWM control logic advances to step 1028. In step 1028, the PWM control logic tests the new sample to determine whether the rotary optical encoder 406 has left the index position (Index I=1), that is, is the new sample greater than $03 (SAMPLE>$03). If the new sample is not greater than $03, then the PWM control logic advances to step 1030. In step 1030, the zero position "00" is stored in the position variable and the previous state of the DIR variable (in the PWM Voltage Control System 600) is set to NEUTRAL. After step 1030, the PWM control logic loops back to step 1004 for new sample readings and the sample is saved in PREVSTA for the next sample comparison operation.

If, in step 1028, the new sample is greater than $03, indicating a departure from the index position, the PWM control logic advances to step 1032. In step 1032, the PWM control logic saves the sample in CURSTATE (current state) and tests the previous state to determine if it is greater than $03 (PREVOUS STATE>$03). This test determines if the previous state was a zero or non-zero state. If not, meaning that the previous state was a zero state, the PWM control logic advances to step 1033 where the previous state of the position variable is initialized to the current sample reading because this is the first non-index, or non-zero, position after the index position. After step 1033, the PWM control logic loops back to step 1004 for new sample readings.

If, in step 1032, the previous state was greater than $03, then the PWM control logic advances to step 1034. In step 1034, the PWM control logic determines first whether a clockwise or counter-clockwise rotation has occurred with respect to FIGS. 7 and 8. After step 1034, the PWM control logic advances to step 1036 where it tests to determine the state transition direction. The state transition direction is determined via the state transitions illustrated and discussed above in association with FIGS. 7 and 8.

If a clockwise transition between states has occurred, the PWM control logic advances to step 1044. In step 1044, the PWM control logic tests to determine whether the optical encoder output signal index I had transitioned from state 0 to state 1 along a clockwise transition path. If the optical encoder output signal index I has transitioned from state 0 to state 1 along a clockwise transition path, the PWM control logic advances to step 1046 where the μC increments its position output and moves the current state CURSTATE into the previous state PREVSTA for the next comparison operation. After step 1046, the PWM control logic loops back to step 1004 where it reads a new sample. If, however, in step 1044 the optical encoder output signal index I has not transitioned from state 0 to state 1 along a clockwise transition path, the PWM control logic simply loops back to step 1004 without incrementing the μC output position.

If, however, in step 1036 a counter clockwise transition had occurred between states, the PWM control logic will advance to step 1038. In step 1038, the PWM control logic tests to determine if the optical encoder has been rotated to a position beyond its index, or home, position. If so, the PWM control logic advances to step 1040 where a flag is set to disable incrementing of the μC output signal until the an index I=0 position is seen. This is performed to prevent incrementing the output position in the event the encoder is rotated beyond the zero position (i.e. index I=0). Such a condition may arise when the pedal returns to a different home position due to damage or improper functioning of a mechanical linkage or stop.

If the optical encoder has not been rotated to a position beyond its index position in step 1038, the PWM control logic advances to step 1042 where the μC decrements its output signal. After either steps 1040 or 1042, the PWM control logic loops back to step 1004 where it reads a new sample. In this fashion the, the PWM control logic increments or decrements the μC position output signal.

Referring now to FIGS. 1A–1C, 5, 7, 8, 10 and 11, an operational description of the PWM-based Analog Voltage Control System 500 of FIG. 5 will be discussed. FIGS. 1A–1C illustrate the physical features of the foot pedal control system, FIG. 5 illustrates the hardware features of the system, FIGS. 7 and 8 illustrate the applicable optical encoder output signal states and transitions and FIGS. 10 and 11 illustrate the μC control logic. The operation description of the PWM control logic for this second illustrated embodiment is identical to that of the first illustrated embodiment, except for the PWM values which are shown in Table 2, no short circuit protection logic and that a step 1007 is present in FIG. 10.

More particularly, after three identical samples have been read by the μC, the PWM control logic advances to step 1007. In step 1007, the PWM control logic closes a start switch relay RY501 (FIG. 5) when after a clockwise transition from a first predetermined state (e.g. index) to a second predetermined state (e.g. non-index). Specifically, an output position transition from position 0 to position 1 (as shown in Table 2) closes the relay RY501 during the Time Load step of 1008. The PWM control logic also opens the start switch relay RY501 when a transition occurs between a further first predetermined state (e.g. non-index) and a further second predetermined state (e.g. index) with an approximately 300 ms delay.

Figure 12:
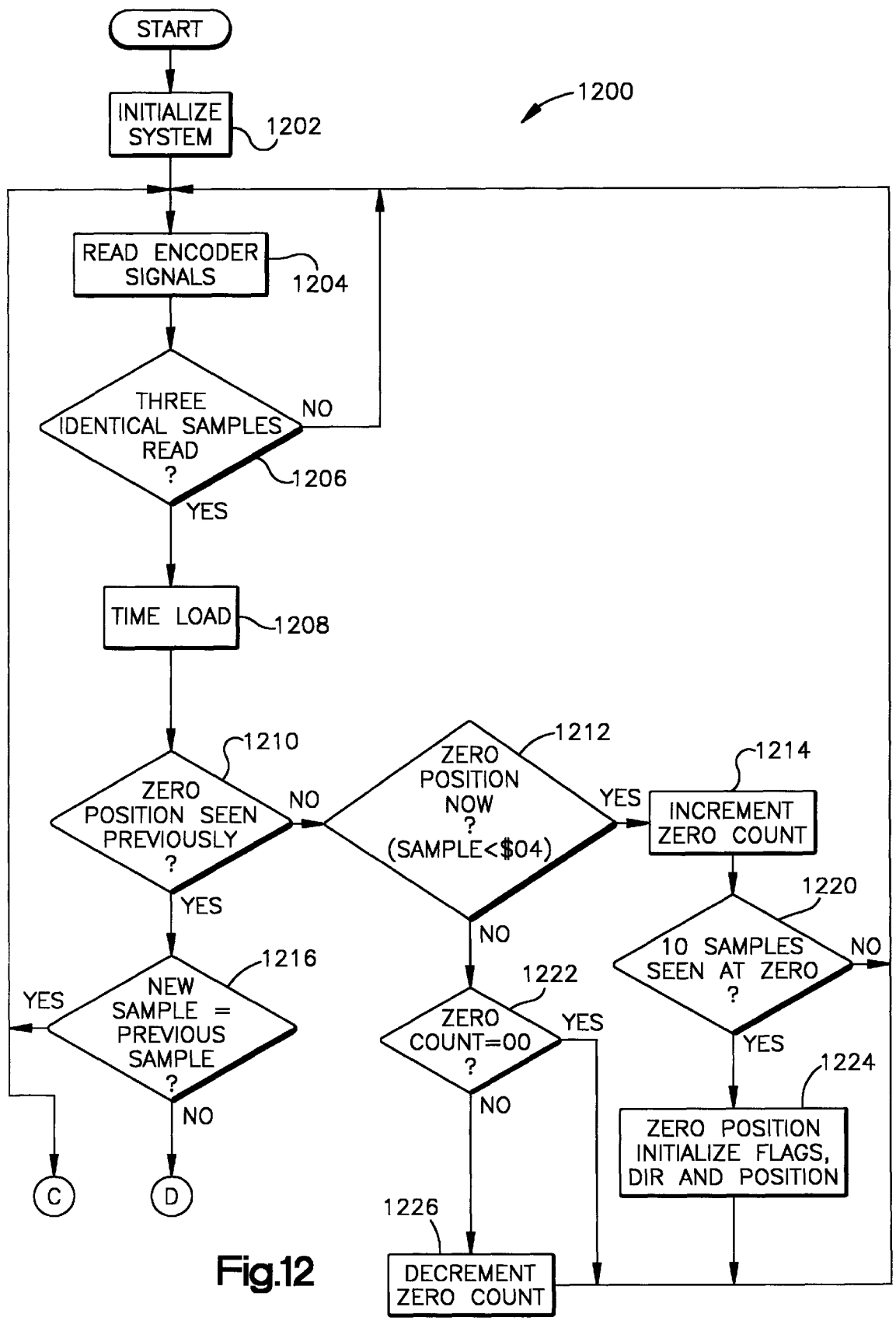
FIGS. 12–13 are flowcharts illustrating a PWM-Direction Control Logic of the present invention.
Figure 13:
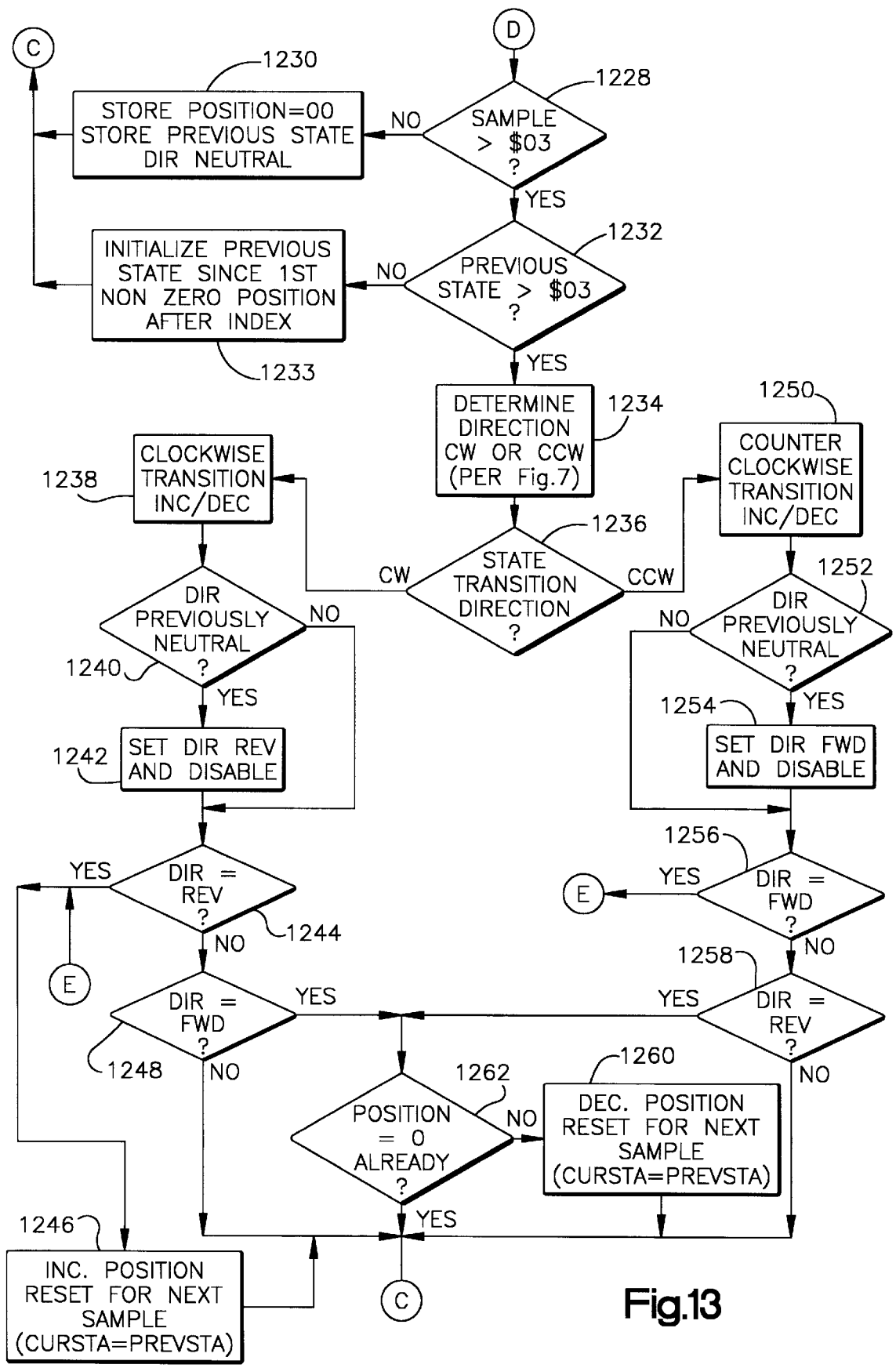

Referring now to FIGS. 2, 3, 6A, 7, 8, 9, 12 and 13, an operational description of the PWM Voltage Control System 600 with direction indication outputs of FIG. 6A will be discussed. FIGS. 2 and 3 illustrate the physical components, FIG. 6A illustrates the hardware components, FIGS. 7–9 illustrate the optical encoder output signal states and their transitions and FIGS. 12 and 13 illustrate the PWM-Direction control logic 1200 of the present invention. The PWM-Direction control logic 1200 of FIGS. 12 and 13 is similar to the PWM control logic 1000 of FIGS. 10 and 11. More particularly, the PWM control logic 1000 steps of 1002 to 1036 are identical to the PWM-Direction control logic 1200 steps of 1202 to 1236, with the exception of the relay logic, and therefore will not be discussed in detail. The reader is referred to the discussion of FIGS. 10 and 11 for such detail. A detailed discussion of steps 1236 to 1262 will now be presently discussed.

More specifically, in step 1236, the PWM-Direction control logic tests to determine whether a clockwise or counter clockwise state transition has occurred (relative to FIG. 7). If a clockwise state transition has occurred, the PWM-Direction control logic advances to step 1238 where a clockwise routine is initiated. After the clockwise routine is initiated, the PWM-Direction control logic advances to step 1240 where it tests to determine whether the previous direction was NEUTRAL (i.e. neither forward or reverse). If the previous direction was NEUTRAL, the PWM-Direction control logic advances to step 1242 where a direction variable is set to reverse "REV" and the direction set function is disabled. The direction is only set upon a transition from an index state to a non-index state (i.e. zero to non-zero state). Thereafter, the direction function is disabled in order to avoid direction changes as the controller is further depressed or released. If, in step 1240, the direction was not previously NEUTRAL, or after step 1242, the PWM-Direction control logic advances to step 1244 where it tests to determine whether the present direction is set to reverse "REV."

If, in step 1244, the direction variable is set to reverse "REV", the PWM-Direction control logic advances to step 1246 where it increments the µC output signal and resets for the next sample (as indicated by the "REV/INC" note of FIG. 7). After step 1246, the PWM-Direction control logic loops back to step 1204 where a new sample is read. If, however, in step 1244, the direction variable is not set to reverse "REV," the PWM-Direction control logic advances to step 1248 where it tests the direction variable to determine whether it is set forward "FWD." If the direction variable is set to forward "FWD," the PWM-Direction control logic advances to step 1262. In step 1262, the PWM-Direction control logic tests to determine whether the current position of the optical encoder is in the zero position. The zero position is equivalent to an index, or home, position of the optical encoder. If the optical encoder is in the zero position, the PWM-Direction controller then loops back to step 1204 where a new sample is read. If, however, in step 1262 the optical encoder is not in the zero position, the PWM-Direction logic advances to step 1260 where it decrements the µC output signal and loops back to step 1204 (as indicated by the "FWD/INC" note in FIG. 7). If, however, in step 1248 the direction variable is not set to forward "FWD," the PWM-Direction control logic loops back to step 1204. Such a circumstance would indicate the presence of an error condition. It should be noted that in the alternative, other courses of action may taken in response to an error condition such as shutting down the accelerator unit.

IF, in step 1236, the PWM-Direction control logic determines that a counter clockwise state transition has occurred (relative to FIG. 7), it advances to step 1250 where a counter clockwise routine is initiated. After the counter clockwise routine is initiated, the PWM-Direction control logic advances to step 1252 where it tests to determine whether the previous direction was NEUTRAL (i.e. neither forward or reverse). If the previous direction was NEUTRAL, the PWM-Direction control logic advances to step 1254 where a direction variable is set to forward "FWD" and the direction set function is disabled. The direction is only set upon a transition from an index state to a non-index state (i.e., zero to non-zero state). Thereafter, the direction function is disabled in order to avoid direction changes as the controller is further depressed or released. If, in step 1252, the direction was not previously NEUTRAL, or after step 1254, the PWM-Direction control logic advances to step 1256 where it tests to determine whether the present direction is set to forward "FWD."

If, in step 1256, the present direction is set to forward "FWD," the PWM-Direction control logic advances to step 1246 where it increments the µC output signal and resets for the next sample (as indicated by the "FWD/INC" note in FIG. 7). If the present direction is not set to forward "FWD," the PWM-Direction control logic advances to step 1258. In step 1258, the PWM-Direction control logic tests to determine whether the present direction is set to reverse "REV." If the present direction is set to reverse "REV," the PWM-Direction control logic advances to step 1262. In step 1262, the PWM-Direction control logic tests to determine whether the current position of the optical encoder is in the zero position. As mentioned previously, the zero position is equivalent to an index, or home, position of the optical encoder. If the optical encoder is in the zero position, the PWM-Direction controller then does not increment if the position equals 0 (i.e., position 0) and loops back to step 1204 where a new sample is read. If, however, in step 1262 the optical encoder is not in the zero position, the PWM-Direction logic advances to step 1260 where it decrements the µC output signal (as indicated by the "REV/DEC" note in FIG. 7) and loops back to step 1204 to read a new sample. If, however, in step 1258 the direction variable is not set to reverse "REV," the PWM-Direction control logic loops back to step 1204 to read a new sample. Such a circumstance would indicate the presence of an error condition. As discussed previously, alternative courses of action may be taken upon the presence of an error condition.

The Operational characteristics of the 4-Bit Output Control 650 system illustrated in FIG. 6B is similar to that of the PWM Control System 400 of FIG. 4 with exception to position output and short circuit protection. The 4-Bit Output Control 650 follows the logic of FIGS. 10 and 11 and outputs a 4-Bit binary value (i.e., BIT 0–3) which is indicative of the foot pedal position. Specifically, the µC 652 outputs a 4-bit value in steps 1042 and 1046 via bit output circuits 662 and 664. The actual 4-bit values may differ from design to design and application to application and therefore will not be discussed in detail.

Calibration Logic

As mentioned previously, the accelerator controllers described herein include diagnostic logic for properly aligning the index signal (I) with the various physical and mechanical configurations (i.e., foot pedal, twist grip, dial, etc.) to which the accelerator controllers may be fitted. When the accelerator controller is powered up at a test voltage, the calibration logic will be initialized and executed. Specifically, the calibration logic will read the optical encoder's output signals I, A and B and will search for the state where I=0 (i.e., indicating a zero position). The calibration logic will then continue to read the output states of index I, A and B so as to determine when the zero position (I=0) of the, for example, foot pedal is a sufficiently positioned within the index pules I=0 for reliable zero position determination.

Figure 14:
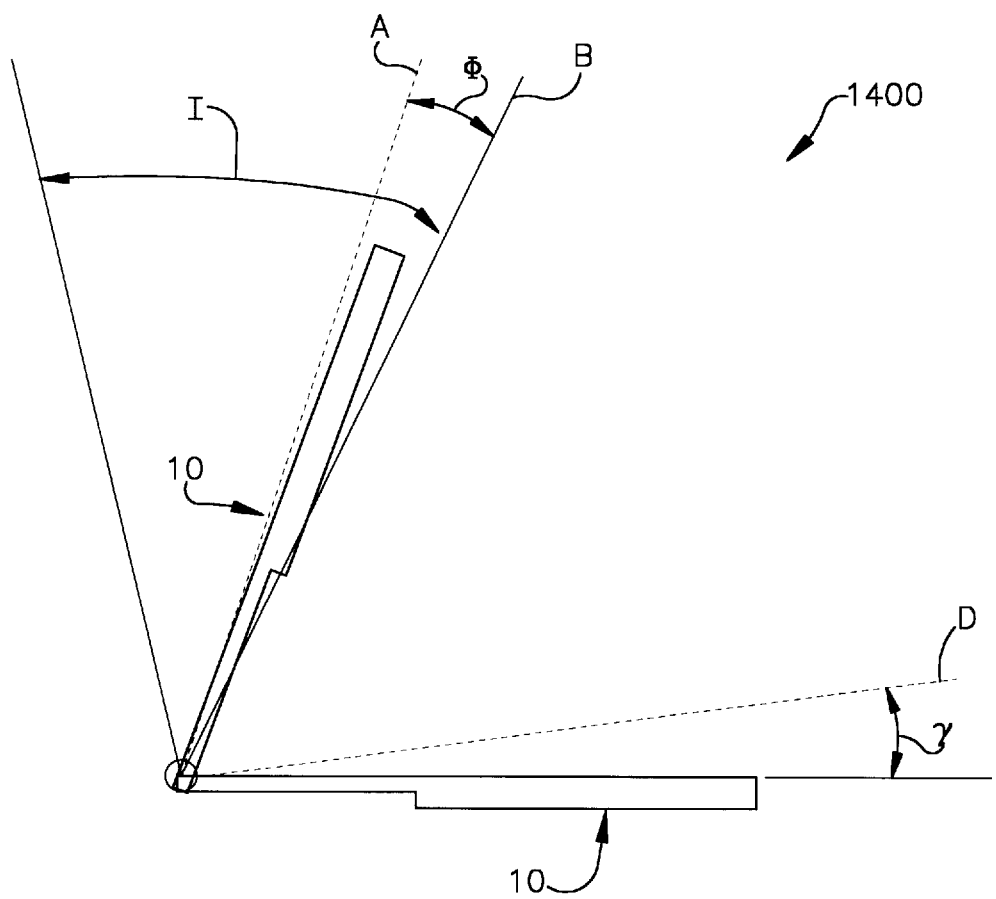
FIG. 14 illustrates the calibration logic with relation to the physical positions 1400 of foot peal 10.

FIG. 14 further illustrates this calibration logic with relation to the physical positions 1400 of foot pedal 10. The index line A, and therefore foot pedal 10, must be aligned beyond the initial index edge B at least φ degrees to ensure that the zero position is always seen when the foot pedal is released and returned to the zero position. The µC counts the positions after the initial index edge B until φ degrees are achieved. This position is then flagged as the zero position. The maximum acceleration line D and a dead space of γ degrees is also shown. The dead space of γ degrees indicates the area of rotation beyond the maximum acceleration line D where the µC position output is not changed even though the foot pedal position is changed. The angle I indicates the width of the index pulse. In the illustrated embodiment, the width of the index angle I is 20 degrees and φ is 7 to 9 degrees. It should be noted that these values are changed based on design specifications and designer preferences.

Short Circuit Protection

The present invention has been heretofore described with two embodiments of short circuit protection: µC monitored (FIG. 4) and PTC thermistor (FIGS. 5, 6A and 6B). The embodiment of short circuit protection employed is generally a function of output circuitry and µC processing overhead. In particular, if the µC has a low processing overhead and directly controls an output transistor, the preferred embodiment of short circuit protection is µC monitored. However, if the µC has a high overhead and/or does not directly control a transistor at the output, the preferred embodiment of short circuit protection is a PTC thermistor configuration. Therefore, the embodiment of short circuit protection employed will depend on the accelerator control system hardware and operation characteristics. Additionally, short circuit protection may be an optional element on all the described embodiments. However, the PWM Control System 400 of the present invention is preferably provided with short circuit protection (as shown in FIG. 4) to protect the μC 402.

While the present invention has been illustrated by the description of embodiments thereof, and while the embodiments have been described in considerable detail, it is not the intention of application to restrict or in any way limit the scope of the appended claims to such detail. Additional advantages and modifications will readily appear to those skilled in the art. For example, the control logic may be implemented in units of sub-logic, the PWM duty cycles may be modified based on design requirements and designer preferences, application specific integrated circuits (ASIC's) may be developed and employed to implement the present logic and a hand throttle or its equivalent may be used instead of a foot pedal or twist grip controller. Additionally, the present invention may be constructed for adaptation to various physical configurations. More specifically, the hardware and logic illustrated in FIGS. 4–13 may supplied as an OEM (Original Equipment Manufacturer) part to purchasers who incorporate the present invention into their own physical configurations. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A method for controlling a motor, the method comprising the steps of:
   (a) generating a plurality of optically encoded controller position signals associated with an operator motor control input, wherein each of the optically encoded controller position signals comprises at least two states;
   (b) reading the states of the plurality of optically encoded controller position signals;
   (c) determining a motor control signal state based on the states of a plurality of optically encoded controller position signals; and
   (d) outputting a motor control signal based on the motor control signal state.

2. The method of claim 1 further comprising the step of determining a motor control signal differential based on a transition from a first motor control signal state to a second motor control signal state.

3. The method of claim 2 further comprising the step of modifying the motor control signal based on the motor control signal differential.

4. The method of claim 3 wherein the step of modifying the motor control signal based on the motor control signal differential comprises the step of incrementing the motor control signal.

5. The method of claim 3 wherein the step of modifying the motor control signal based on the motor control signal differential comprises the step of decrementing the motor control signal.

6. The method of claim 1 wherein the step of determining a motor control signal state based on the states of a plurality of optically encoded controller position signals comprises the step of determining whether the states of the plurality of optically encoded controller position signals indicate that the optically encoded controller position is an index position.

7. The method of claim 1 wherein the step of outputting a motor control signal based on the motor control signal state comprises the step of outputting a pulse width modulated motor control signal.

8. The method of claim 1 wherein the step of outputting a motor control signal based on the motor control signal state includes the step of outputting an analog motor control signal.

9. The method of claim 1 further including the step of monitoring the motor control signal for a high current condition.

10. The method of claim 1 wherein the step of generating a plurality of optically encoded controller position signals associated with an operator motor control input comprises the step of monitoring the position of a foot pedal.

11. The method of claim 1 wherein the step of generating a plurality of optically encoded controller position signals associated with an operator motor control input comprises the step of monitoring the position of a twist grip.

12. A method for controlling a motor, the method comprising the steps of:
   (a) generating a plurality of optically encoded controller position signals associated with an operator motor control input, wherein each of the optically encoded controller position signals comprises at least two states;
   (b) reading the states of the plurality of optically encoded controller position signals;
   (c) determining a motor control signal state based on the states of a plurality of optically encoded controller position signals;
   (d) determining a motor control direction based on the states of a plurality of optically encoded controller position signals;
   (e) outputting a motor control signal based on the motor control signal state; and
   (f) outputting a motor control direction signal based on the motor control direction.

13. The method of claim 12 further comprising the step of determining a motor control signal differential based on a transition from a first motor control signal state to a second motor control signal state.

14. The method of claim 13 further comprising the step of modifying the motor control signal based on the motor control signal differential.

15. The method of claim 14 wherein the step of modifying the motor control signal based on the motor control signal differential comprises the step of incrementing the motor control signal.

16. The method of claim 14 wherein the step of modifying the motor control signal based on the motor control signal differential comprises the step of decrementing the motor control signal.

17. The method of claim 12 wherein the step of outputting a motor control signal based on the motor control signal state comprises the step of outputting a pulse width modulated motor control signal.

18. The method of claim 12 wherein the step of outputting a motor control signal based on the motor control signal state includes the step of outputting an analog motor control signal.

19. The method of claim 12 further including the step of monitoring the motor control signal for a high current condition.

20. The method of claim 12 wherein the step of generating a plurality of optically encoded controller position signals associated with an operator motor control input comprises the step of monitoring the position of a foot pedal.

21. The method of claim 12 wherein the step of generating a plurality of optically encoded controller position signals associated with an operator motor control input comprises the step of monitoring the position of a twist grip.

22. An apparatus for controlling a motor, the apparatus comprising:
(a) an input device for allowing an operator motor control input, the operator motor control input having a position signal;
(b) an optical encoder in physical communication with the input device and for optically encoding the position signal associated with the input device, wherein the optical encoder comprises a plurality of optical encoder output signals;
(c) a programmable controller device in circuit communication with the optical encoder and for controlling the motor; the programmable controller device comprising:
(1) an optical encoder input port for reading the plurality of optical encoder output signals;
(2) motor control logic for controlling the motor; and
(3) an output port for outputting a first motor control signal;
(d) an output circuit in circuit communication with the programmable controller device and for outputting a second motor control signal to the motor.

23. The apparatus of claim 18 wherein the first motor control signal comprises a pulse width modulated motor control signal.

24. The apparatus of claim 18 wherein the motor control logic for controlling the motor comprises logic for determining the directional characteristics of the motor.

25. The apparatus of claim 22 wherein the input device comprises a foot pedal.

26. The apparatus of claim 22 wherein the input device comprises a twist grip.

27. The apparatus of claim 22 wherein the motor control logic comprises:
(i) logic for determining a motor control signal state based on the states of the plurality of optical encoder output signals; and
(ii) logic for determining a motor control direction based on the states of the plurality of optical encoder output signals.

* * * * *